March 4, 1941. W. S. BACHMAN 2,233,467
APPARATUS FOR DISPENSING HYPOCHLORITES
Filed May 25, 1939
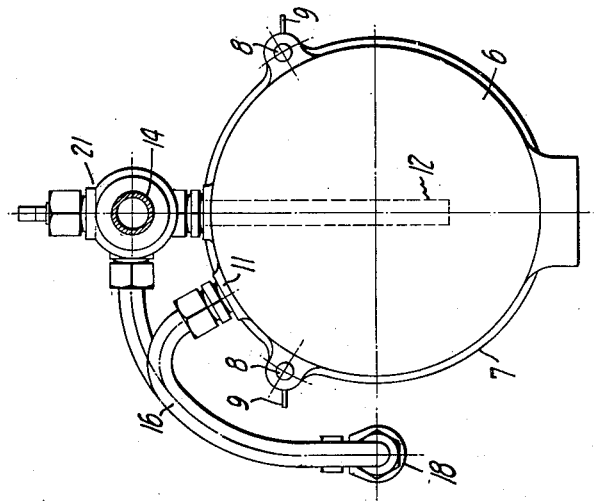
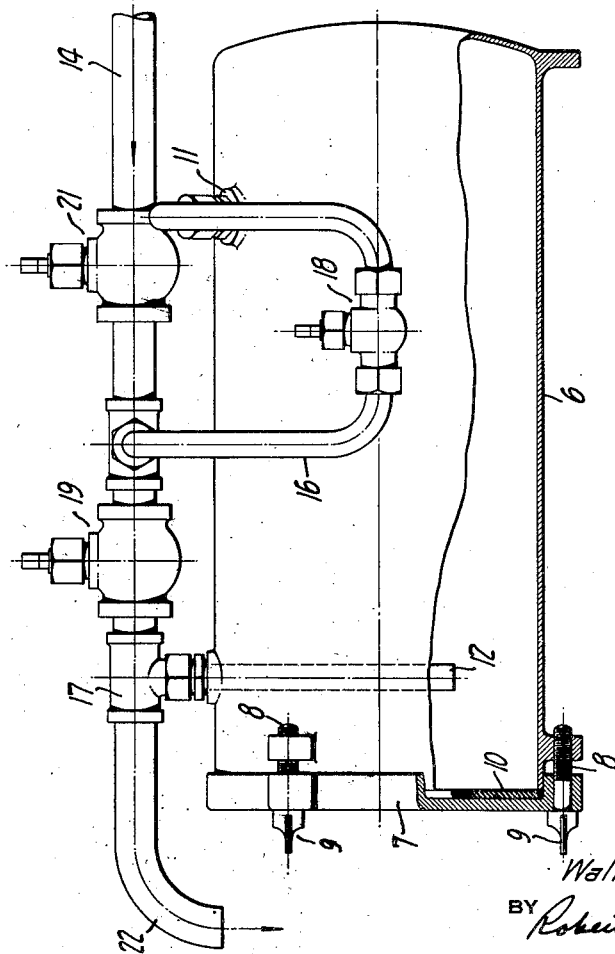
INVENTOR
Walter S. Bachman
BY Robert H. Eckhoff
ATTORNEY Patented Mar. 4, 1941

2,233,467

UNITED STATES PATENT OFFICE 2,233,467

APPARATUS FOR DISPENSING HYPOCHLORITES

Walter S. Bachman, Los Angeles, Calif.

Application May 25, 1939, Serial No. 275,628

2 Claims. (Cl. 210—36)

This invention relates to an apparatus for dispensing hypochlorites. More particularly it relates to an apparatus for applying to water sterilization the hypochlorite pellet of my Patent 2,023,419 of December 10, 1935. In that patent I have disclosed a pellet comprised of calcium hypochlorite bonded together with a cementing material so that a substantially stable product is provided.

The dispensing of hypochlorite into a water stream, particularly a domestic or household water supply, presents a peculiar difficulty in that the water is not used at anything approximating a uniform rate. For example, during certain hours of the day when water is drawn for laundry or washing purposes, the water consumption rate is relatively high, while at night the rate drops off substantially to zero. A hypochlorite in contact with water liberates some gaseous chlorine which collects during the period when the water is not being used and is objectionably released as a gas, depending upon the extent of the accumulation. The present invention provides an apparatus which enables a hypochlorite to be distributed from a calcium hypochlorite pellet into a water stream without formation of chlorine gas bubbles which are suddenly released after the water supply has been at rest for some time.

It is in general the broad object of the present invention to provide an apparatus for supplying hypochlorite to a domestic water supply.

Another object of the present invention is to provide a simple, inexpensive, and yet rugged apparatus for releasing hypochlorite into a domestic water supply at a substantially uniform rate.

The invention includes other objects and features of advantage, some of which, together with the foregoing, will appear hereinafter wherein the present preferred form of apparatus for dispensing hypochlorite has been disclosed. In the drawing accompanying and forming a part hereof, Figure 1 is a side elevational view, partly in section, through an apparatus embodying the present invention.

Figure 2 is an end view of the apparatus shown in Figure 1.

Referring to the drawing, I have disclosed a closed vessel 6 having a head or cover 7 thereon. This head carries a gasket 10 and is retained in place by a plurality of studs 8 carrying wing nuts 9 which retain the removable cover in place. The vessel and the various parts associated therewith are made of suitable materials to resist corrosion. A supply of the material to be dispensed, such as the aforementioned hypochlorite pellet, is placed within the vessel. An inlet 11 is provided upon the vessel to admit water thereto. The vessel is also provided with an outlet 12, usually in the form of a tube, which depends from a fitting screwed into the tank towards the bottom thereof so that liquid circulates between the inlet and the outlet, dissolves hypochlorite and is carried out of the vessel through the tube 12 and into the line 14.

A water supply line is provided as indicated by the numeral 14. From this line is extended a first pipe connection 16 to the inlet 11. A second pipe connection is established between the water line 14 and the tube 12, in the form of a T-fitting 17.

To control the quantity of water passing through the vessel, a valve 18 is provided in line 16. An adjustable valve 19 is provided between the first and second pipe connections. This valve can be partially closed to pass more or less water through the apparatus to produce a strong or weak chlorine concentration as is necessary to the water sterilization. A shut off valve 21 is provided in the line ahead of the first pipe connection.

In operation, the valve 21 being open, valves 18 and 19 are adjusted so that more or less water is by-passed through pipe 16 into the vessel and over the pellet therein. Because the outlet from the vessel in the form of tube 12 is connected to the discharge side of the water supply line 14, gas accumulated in the vessel is discharged therefrom and is not permitted to remain in the vessel when valve 21 is closed, outlet 22 being ordinarily open.

Valve 19 is employed to control the quantity of water passed through the vessel while valve 18 is employed to control further the chlorine supplied to the water. Manipulation of these valves permits proper chlorine dosage to be secured under any given set of conditions. The open outlet 12 is of advantage because it permits quick and full release of strongly chlorinated water into the water stream as well as gas release, thus taking advantage of the chlorine release as it occurs and obviating building up of a gaseous chlorine content in the vessel. With outlet 12 depending to adjacent the bottom of vessel 6 and inlet 11 at the top, adequate cross circulation is secured through the vessel.

The apparatus disclosed is not limited in application to domestic or household use alone. It is suited to commercial, restaurant, and bar use as well.

The apparatus disclosed can be successfully employed upon hot or cold water. This is of particular advantage because it permits sterilization of hot water for dishwashing purposes, a matter of some importance in restaurants and like places. Inasmuch as the container starts out full of cold water, the amount of hot water entering through the inlet is such a small quantity that by the time the necessary amount of chlorinated water has been discharged for usage, sufficient hot water will not have run into the container to greatly affect the temperature of the water originally therein. Because of the relatively large radiating surface of the container, the temperature usually falls before a second demand is made, so that the temperature of the water therein does not rise appreciably and thus any extreme decomposition due to hot water is obviated. If any difficulty is encountered, the length of the pipes to the inlet and outlet can be extended, and can be provided with radiation fins so that relatively cold water enters the vessel.

I claim:

1. A hypochlorite feeder for attachment to a water line comprising a water line having an open discharge end, a closed vessel having an inlet and an outlet and providing a chamber, said inlet being at an elevation above that of said outlet, a first pipe connection to said water line from said vessel inlet, a valve in said water line ahead of said first connection controlling water flow through said water line, a second pipe connection to said water line from said vessel outlet, said second connection being adjacent said open discharge end of said water line and beyond said first connection, whereby discharge from said vessel is unimpeded, and means for controlling the extent of water flow through said closed vessel during water flow in said water line.

2. A hypochlorite feeder for attachment to a water line comprising a water line having an open discharge end, a closed vessel having an inlet and an outlet and providing a chamber, said inlet being at a point adjacent the top of said vessel, a pipe depending from said outlet into said vessel to adjacent the bottom of said vessel, a first pipe connection to said water line from said vessel inlet, a valve in said water line ahead of said first connection for controlling water flow through said water line, a second pipe connection to said water line from said vessel outlet, said second pipe connection being adjacent said open discharge end of said water line whereby discharge from said vessel is unimpeded, a valve in said water line between said connections, and a valve in one of said connections controlling the extent of water flow through said closed vessel when water flows in said water line.

WALTER S. BACHMAN.